United States Patent [19]

Morgan

[11] Patent Number: 4,482,269

[45] Date of Patent: Nov. 13, 1984

[54] SEAWALL BARRIER

[75] Inventor: Burton D. Morgan, Hudson, Ohio

[73] Assignee: Top Roc Precast Corporation, Hudson, Ohio

[21] Appl. No.: 306,512

[22] Filed: Sep. 28, 1981

[51] Int. Cl.³ .............................................. E02B 3/06
[52] U.S. Cl. ........................................ 405/29; 52/600
[58] Field of Search ...................... 405/21, 25, 29, 30, 405/33, 35, 273, 284, 286; 52/600, 611, 722

[56] References Cited

U.S. PATENT DOCUMENTS

| 1,472,917 | 11/1923 | Laird | 405/273 |
| 1,909,539 | 5/1933 | Huntoon | 405/273 |
| 3,380,253 | 4/1968 | Vita | 405/29 |
| 3,636,713 | 1/1972 | O'Neill | 405/29 |
| 3,753,553 | 8/1973 | Bockting | 405/29 |
| 3,888,209 | 6/1974 | Boots | 405/25 |

Primary Examiner—David H. Corbin
Attorney, Agent, or Firm—Oldham, Oldham, Hudak & Weber, Co.

[57] ABSTRACT

A seawall barrier comprising a relatively massive elongate wire cable reinforced concrete structure with a shank and diverging feet that has reinforcing cables embedded in the structure barrier and being threaded through a reinforcing member at the feet portion of the structure.

3 Claims, 4 Drawing Figures

SEAWALL BARRIER

TECHNICAL FIELD

This invention relates to seawall barrier or units, especially to concrete structures, steel cable reinforced, that are formed of appreciable size and weight and adapted to be used where a plurality of seawall barriers can be placed in operative association with each other for preserving or maintaining land or a seawall against wind and wave damage.

BACKGROUND ART

At the present time, there have been a lot of different types of barriers proposed for use in forming seawalls along different types of terrain at the margins of various bodies of water in the world.

These seawall barriers may comprise various types of concrete or wood jetties that extend out into the ocean a short distance. While a number of these prior structures have been fairly effective for short times in reducing or preventing errosion by the weathering and damaging forces of the wind and waves, there always is a need for an improved type of a seawall barrier that can be readily positioned on a shoreline to retard or prevent errosion thereof.

DISCLOSURE OF INVENTION

The general object of the present invention is to provide a novel, uncomplicated type of reinforced concrete structure including an elongate shank portion terminating at one end with a plurality of diverging feet portions thereon, and reinforcing and strengthening wire cables positioned within the concrete structure and extending axially of the shank portion and feet to reinforce the same.

Another object of the invention is to provide a relatively massive structure having a plurality of heavy reinforcing prestressed cables extending axially thereof and wherein reinforcing members are also positioned in each of the feet portions of the seawall barrier which additionally can have a lifting hook provided on one portion thereon and connected to one of the reinforcing cables within the concrete structure.

Yet another object of the invention is to provide a relatively massive wire cable reinforced concrete structure that has a reinforcing member engaging reinforcing cables embedded in the structure and extending both radially and axially of the seawall barrier but being threaded over and around the reinforcing member.

Yet another object of the invention is to provide a generally anchor type of a construction which can be formed from conventional concrete materials by known apparatus and methods and wherein prestressed metal cables are provided in the seawall barrier and reinforcing means also extend axially of the barrier in the individual feet thereof.

The foregoing and other objects and advantages of the invention will be made more apparent as the specification proceeds.

BRIEF DESCRIPTION OF DRAWINGS

Reference now is particularly made to the accompanying drawings, wherein.

When referring to corresponding members shown in the drawings and referred to in the specification, corresponding numerals are used to facilitate comparison therebetween.

BEST MODE FOR CARRYING OUT THE INVENTION

A seawall unit or barrier comprising a metal cable reinforced concrete structure including a shank portion and a plurality of diverging feet at one end of the shank portion, and reinforcing wires in the shank portion and feet of the unit, which wires can be threaded around a reinforcing member located within the concrete structure at the connection of the feet to an end of the shank portion.

Figure 1:
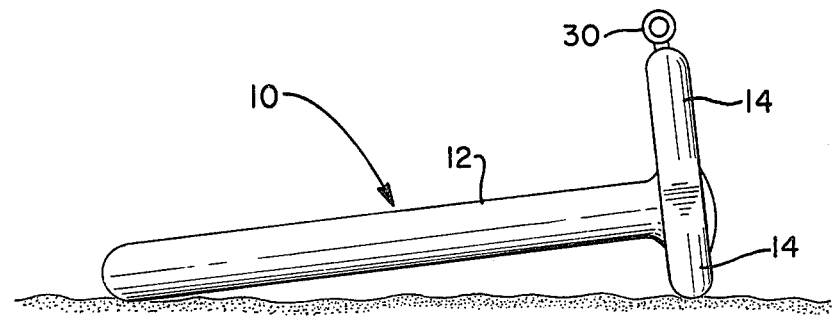
FIG. 1 is a side elevation of a seawall unit or barrier, embodying the principles of the invention, showing it on a support surface.
Figure 2:
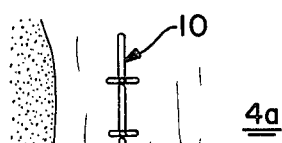
FIG. 2 is an end or a right side elevation of the article of FIG. 1.
Figure 2:
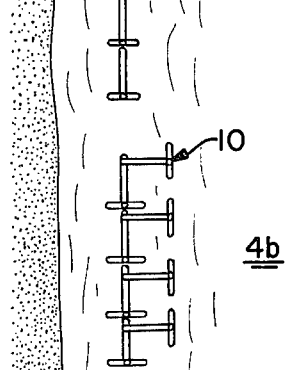
Figure 2:
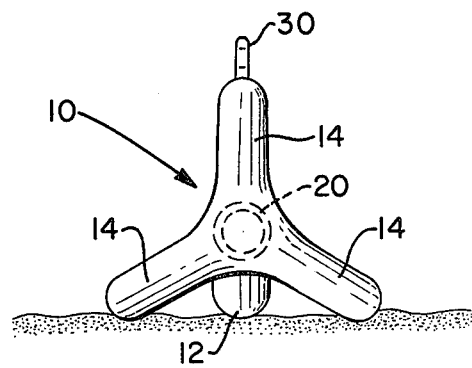

Attention now is particularly directed to the details of the construction shown in the drawings, and a seawall unit or barrier of the invention is indicated as a whole by the numeral 10. This barrier 10 comprises a concrete structure which has a shank portion 12 which has a plurality of diverging feet 14 at one end of such shank portion. These feet 14 usually are at about 120° angular relationships to each other and they form a balanced structure as shown in FIG. 2. Three feet are present to provide a more or less anchor shaped construction for the barrier 10.

The barrier 10 has a plurality of prestressed wires or cables of conventional composition 16 suitably positioned therein and extending the axial length of this shank 12 for reinforcing and strengthening the barrier. Additionally, the barrier has additional reinforcing wires or cables 18 therein that extend at least a portion of the length of the shank 12 at the feet area thereof and which additional cables 18 at least have one cable thereof extending out axially of each of these feet portions 14 as indicated diagrammatically in FIG. 3 at 18a.

To aid in positioning the reinforcing cables in the barrier 10, a reinforcing means 20 in the form of a ring is located in the plane of the barrier, defined by the feet portions 14 which all extend from the shank at substantially 90° angular relationship to the axis thereof. Such reinforcing means 20 is made of any conventional material. The reinforcing cables or wires 18 for the portions thereof that extend into the feet 14 are threaded around this guide 20 to aid in maintaining the cables in position around this guide 20 to aid in maintaining the cable in position embedded in the concrete. All of the wires or cables 16 and 18 aid in distributing stresses to the different portions of the barrier 10.

Figure 3:
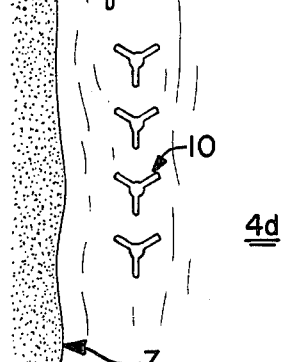
FIG. 3 is a diagrammatic outline of the seawall barrier of FIG. 1 but showing the reinforcing members therein.
Figure 3:
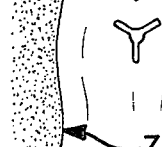
Figure 3:
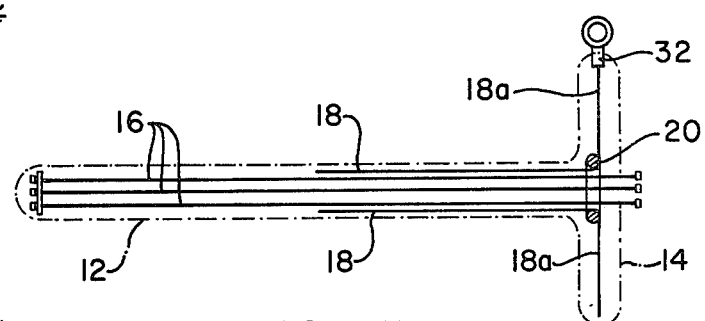

As another feature of the invention, a lifting means 30 is provided thereon on one of the feet 14 at the end thereof. This lifting means 30 may comprise a ring that is suitably secured as by welding or otherwise by a connecting sleeve, collor or neck 32 to the end of one of these reinforcing cables 18, as indicated in FIG. 3. Hence transport of this barrier 10 is facilitated.

It should be appreciated that the barriers 10 are of appreciable size so that they have enough weight and length as to aid in retaining land masses at the edge of an ocean or other body of water and resist erosion and sea wave damage to the land areas. Thus the barriers could be, for example, over 15' long, such as about 18' long, and the usual maximum height or width of the barrier at the feet portion thereof could be, for example, about 7' and preferably over 5' so that a sizeable barrier is provided. This will aid in retaining land in position against wind and wave errosion and damage.

Figure 4:
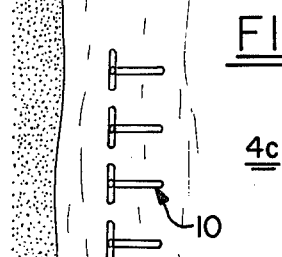
FIG. 4 is a somewhat diagrammatic view showing a plurality of the seawall barrier units of the invention when positioned in different operative relationship with each other.

In the different portions of FIG. 4, I have shown how a plurality of these barriers 10 can just be arranged in axial alignment with each other in substantially abutting relationship to form an elongate barrier along an edge of a body of water, while portion b of FIG. 4 shows how you can also add additional seawall barriers indicated at 10b that extend perpendicularly to the other barriers extending along more or less parallel to an edge of the body of water indicated at Z. Portion c of FIG. 4 shows how the seawall barrier could just be placed in the body of water with the shank portions extending out towards the body of water while FIG. 4d shows that the barriers if desired, could be positioned on their feet portions to extend up into the air or they could have the shank portions thereof more or less forced down into the ground a short distance to have the feet portions remaining upright to aid in engaging land and holding it in position. However, of course the seawall barriers can be used to any desired relationship to each other and to the water edge.

Naturally the barriers are made from conventional concrete mixtures and the reinforcing cables therein are of known construction that are positioned in the barriers in prestressed form by use of conventional means.

From the foregoing it is seen that a relatively uncomplicated but sturdy seawall barrier has been provided and this can have an effective service life and the barrier is of a design to give good retentative action for land bordering on the ocean to prevent wave and wind damage thereto. Thus the objects of the invention have been achieved.

While one complete embodiment of the invention has been disclosed herein, it will be appreciated that modification of this particular embodiment of the invention may be resorted to without departing from the scope of the invention.

What is claimed is:

1. A seawall unit comprising:

a reinforced concrete structure including a shank portion and at least three diverging feet at one end of the shank portion, said feet being of such length and being positioned in relation to each other to retain, normally, two feet on the ground and said one end of said shank off the ground when the unit is placed on the ground with the other end of the shank and said feet positioned on the ground;

reinforcing wires in the shank portion and feet; and certain of said reinforcing wires extending the length of said shank portion, and an annular reinforcing member is embedded in the concrete structure at the junction of said feet and shank portion; said wires extending out into said feet being threaded around said reinforcing member.

2. A seawall unit as in claim 1, where a plurality of axially extending prestressed wires extend along said shank portion, and at least one wire is positioned in each of said feet to extend axially thereof and a lifting means is provided at the end of one of said feet and it is secured to a reinforcing wire positioned in said foot.

3. A seawall unit as in claim 1 where said shank portion is over ten (10) feet long and the unit has a maximum width of over five (5) feet at the feet thereof.

* * * * *